Nov. 17, 1970  G. D. WILLITS ET AL  3,541,365
LEAD CHANGING TERMINAL ASSEMBLY FOR A DYNAMOELECTRIC MACHINE
Filed Feb. 5, 1969  2 Sheets-Sheet 1
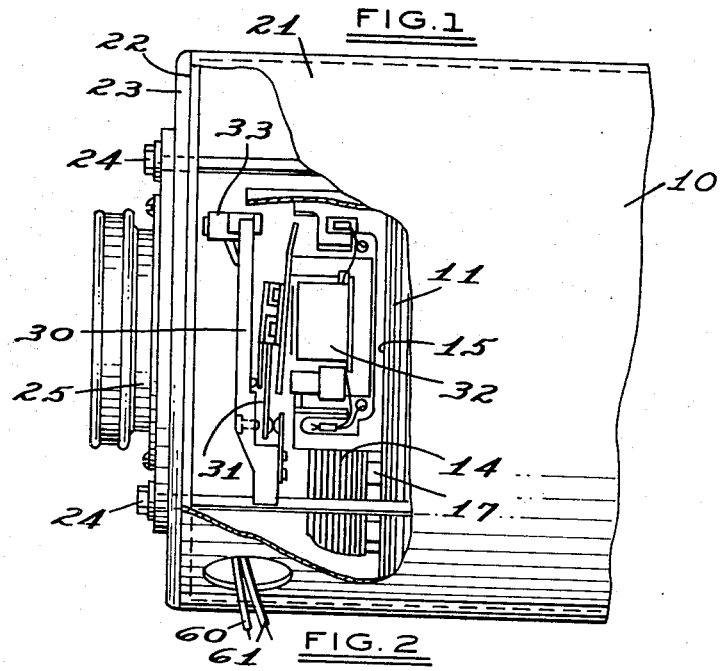
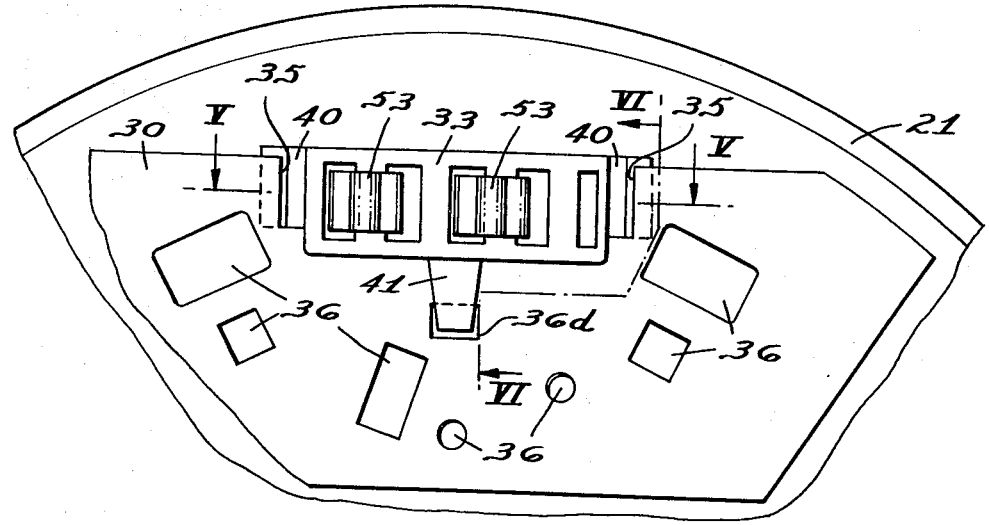
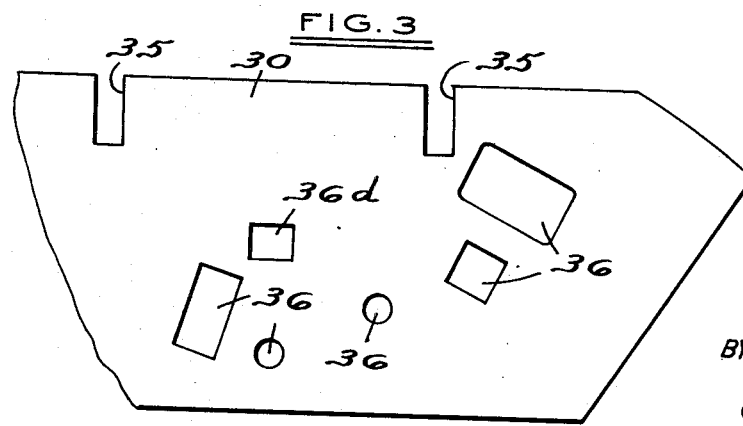
INVENTORS
GLENN D. WILLITS
RICHARD E. SEELY
BY
Allard A. Braddock
ATTORNEY Nov. 17, 1970   G. D. WILLITS ET AL   3,541,365
LEAD CHANGING TERMINAL ASSEMBLY FOR A DYNAMOELECTRIC MACHINE
Filed Feb. 5, 1969

INVENTORS
GLENN D. WILLITS
RICHARD E. SEELY
BY
Allard A. Braddock
ATTORNEY

United States Patent Office 3,541,365
Patented Nov. 17, 1970

3,541,365
LEAD CHANGING TERMINAL ASSEMBLY FOR A DYNAMOELECTRIC MACHINE
Glenn D. Willits, Auburn, and Richard E. Seely, Fort Wayne, Ind., assignors to General Electric Company, a corporation of New York
Filed Feb. 5, 1969, Ser. No. 796,814
Int. Cl. H02p 1/26
U.S. Cl. 310—71                    4 Claims

ABSTRACT OF THE DISCLOSURE

An electric motor with two running windings enabling low-voltage and high-voltage operation has leads from the running windings connected to female terminals positioned in aligned and spaced pockets in a terminal block which has a pair of feet and a locking tongue, the feet serving to position the block in indentations in a terminal board and the locking tongue serving to snap into locked position in an aperture in the terminal board. Manually removable U-shaped male connector links are selectively positioned in the female terminals within the terminal block pockets to connect the running windings in series relationship for high-voltage operation and in parallel for low-voltage operation.

BACKGROUND OF THE INVENTION

Many electric motors are designed to operate on either low voltage or high voltage, the high voltage being twice the low voltage. For example, a motor may operate at 115 volts or 230 volts at the option of the user. Such motors are provided with two running windings and circuits selectively controllable to connect these windings in series for high voltage operation or in parallel for low voltage operation. Frequently, a manually operable switch is provided for shifting the voltage rating of the motor. It is important that means be provided to avoid careless operation of the switch as the motor can be damaged very quickly at high voltage operation with the windings connected in parallel or low voltage operation with the windings connected in series. Generally, the service life of the motor will be spent at either low voltage or high voltage, so an initial setting of the running windings is all that is necessary. Nevertheless, it is desirable that the flexibility of quickly shifting from one voltage to the other be retained even after the motor is initially set for a particular voltage.

SUMMARY OF THE INVENTION

The invention has as its aim the provision of a terminal block easily mounted upon a terminal board positioned inside one of the end plates of an electric motor, the terminal block including circuit control elements which will allow manually removable circuit links to be selectively inserted in order to place the running windings in either series or parallel circuit relationship. The terminal block is sufficiently accessible to provide easy selection of a high voltage or low voltage circuit; yet it is not so accessible as to enable an unintended shift to a different voltage setting once an initial voltage setting has been made.

BRIEF DESCRIPTION OF THE DRAWINGS

The objects, features and advantages of the invention will appear more clearly from the following detailed description of the preferred embodiment thereof made with reference to the drawings in which FIG. 1 is a fragmentary plan elevational view, partly broken away, showing one end of a dynamoelectric machine incorporating the preferred embodiment of the present invention; FIG. 2 is a fragmentary end view of the machine of FIG. 1 with the end plate removed showing a terminal board with a terminal block mounted thereon; FIG. 3 is a view of the terminal board illustrated in FIG. 2 showing apertures and indentations used in mounting circuit control elements thereon.

DESCRIPTION OF PREFERRED EMBODIMENT

Figure 7:
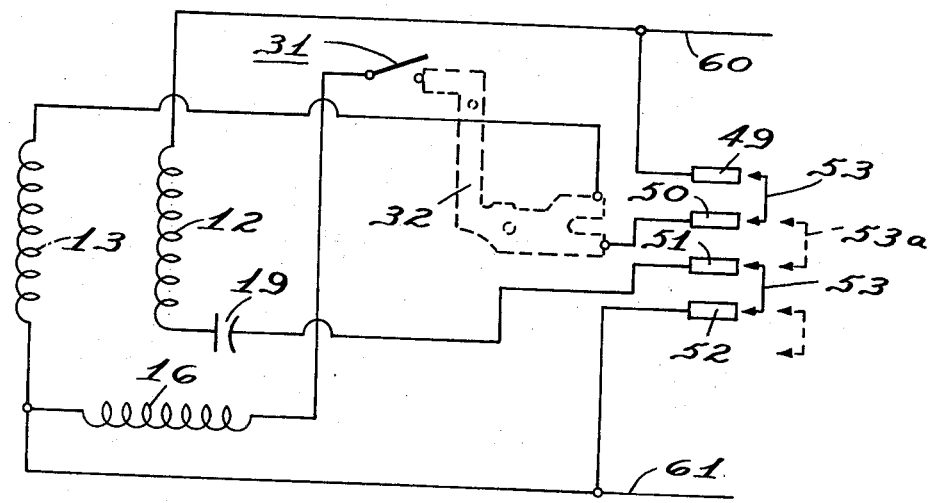
FIG. 7 is a schematic diagram illustrating the manner of operation of the control circuit of the dynamoelectric machine illustrated in FIG. 1.
Figure 4:
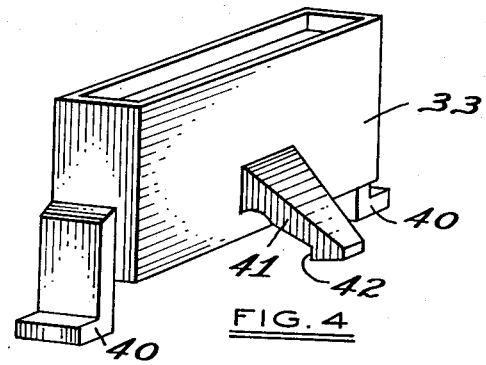
FIG. 4 is a perspective view of the terminal block shown in FIG. 2 in mounted position.

The preferred embodiment of the invention illustrated in the drawings comprises a single phase induction electric motor 10 of the resistance split phase or capacitor start type. The motor includes a laminated stator core 11 of standard construction formed by a stacked plurality of laminations punched from relatively thin magnetic contour. The motor 10 is designed for operation at a low-voltage level or a high-voltage level, e.g., 115 volts or 230 volts. Consequently, it has two running windings 12 and 13 (FIG. 7) arranged in stator winding accommodating slots in the usual way with end turns 14 (FIG. 1) projecting beyond each side face 15 of the core. For reasons of simplicity of illustration and brevity of description, only one side of motor 10 has been shown in FIG. 1. An auxiliary or starting winding 16 (FIG. 7) is displaced 90 electrical degrees from the main winding in the slots for the usual reasons. Each winding is wound with a number of turns of insulated wire, e.g., magnet wire, to form winding poles in a well known manner, the windings being insulated from the core by standard slot lines 17. A capacitor 19 (FIG. 7) is part of the circuit of capacitor start motors but is omitted in the case of resistance split phase motors. All of windings 12, 13 and 16 are adapted to be energized during starting but only the running windings 12 and 13 are excited for running operation as will be explained more fully hereinafter.

The stator core is mounted within a cylindrical central shell 21 fabricated of sheet material like steel or equivalent. The core is secured to the frame by press fit or by welding at angularly spaced apart locations. The shell 21 extends axially beyond winding end turns 14 terminating on each side in an edge 22 having an overlying end shield 23. A number of angularly spaced apart through bolts 24 secure the assembly firmly together. Each end shield incorporates a central hub 25 mounting bearing for rotatably supporting one end of a shaft (not shown) which, in turn, carries a conventional rotor (not shown) having a cast squirrel cage type winding.

As illustrated in FIG. 1, a terminal board 30 composed of insulating material has a number of circuit control elements mounted thereon. One of these is a switch 31 which responds to an actuator member 32 to open the energizing circuit for starting winding 16 after the motor reaches a pre-determined speed. A circuit control element which is one of the features of this invention comprises a terminal block 33 composed of insulating material and mounted upon the terminal block 30.

As best shown in FIG. 3, the terminal board 30 has peripheral indentations 35 and a number of apertures 36 and 36a. Both the indentations and apertures serve to mount elements on the terminal board 30. One such element is the terminal block 33.

Figure 5:
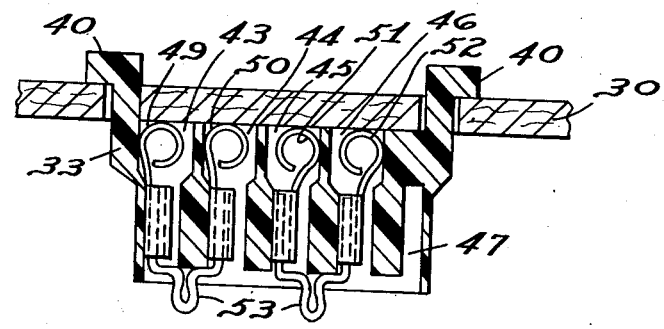
FIG. 5 is a sectional view of the terminal block taken along the line V—V of FIG. 2.
Figure 6:
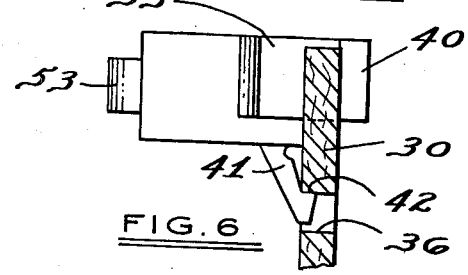
FIG. 6 is another sectional view of the terminal block taken along the line VI—VI of FIG. 2.

The terminal block 33 is preferably composed of a molded plastic material. Molded integrally with the block are a pair of feet 40 and a locking tongue 41, the tip of which has a configuration 42 which enables the tongue to serve as a catch in mounting the block 33 on the terminal board 30. As best shown in FIG. 5, the block 33 includes five pockets 43–47. Pockets 43 to 46, inclusive, serve to position female terminal connectors 49–52 to which the circuits controlling energization of the running windings 12 and 13 are connected. A pair of manually removable male connector links 53 are shown in electrical connection with the female terminals 49–50 and 51–52, respectively. The pockets 46 and 47 of the block 33 serve as a place to store one of the connector links 55 in the event it is not needed as a circuit element.

The terminal block 33 may be readily positioned on the terminal board 30 by sliding the feet 40 into the indentations 35. During mounting the locking tongue 41 engages the surface of the terminal board 30 and slides along it until the catch 42 dips into the aperture 36a positioned mid-way between the indentations 35. The normal resilience of the locking tongue 41 produces a snap action which seats the catch 42 into the aperture and thus positions the terminal block 33 on the terminal board 30.

FIG. 7 illustrates the motor control circuits. The motor is connected to line voltage at leads 60 and 61. The circuit illustrates the motor in low-voltage operation with the switch 31 opened to leave the start winding 16 unenergized. For low-voltage operation, the running windings 12 and 13 are connected in parallel. The current entering through lead 60 divides one part going through the winding 12, the terminals 51 and 52, and then to the line lead 61. A parallel circuit from the point of division passes through the connectors 49 and 50, then through the actuator member 32, then through the winding 13 to the line conductor 61.

For high-voltage operation, the links 53 are detached from the female connectors 49–50 and 51–52 and, instead, one of the links connects the female connectors 50 and 51 as shown by link 53a in dotted lines while the other link is stored by inserting in the pocket 47 and the connector 52 in the pocket 46. This connects the running windings 12 and 13 in series. The circuit from the lead 60 passes through the winding 12, the female connectors 51 and 50, the starting device 32, the winding 13, and the lead 61.

The terminal block and circuit selecting means of this invention provide a convenient way to select a motor circuit to operate at the voltage used at the initial installation of the motor. The manually removable links 53 are sufficiently inaccessible to avoid careless reset of the voltage once it has been initially set. However, if it should be necessary to reselect the voltage at a later date, the links 53 can be readily exposed and rearranged as necessary.

While the invention has been described above with reference to a particular embodiment, it is obvious that there may be variations which fall within the proper scope of the invention. Therefore, it is intended that the invention be limited in scope only as may be necessitated by the scope of the appended claims.

What we claim as new and desire to secure by Letters Patent of the United States is:

1. In a dynamoelectric machine comprising a frame, a stator mounted within said frame and carrying a start and two running windings having end turns projecting beyond the side faces of said stator; a terminal board mounted within said frame adjacent one set of end turns, said terminal board consisting of insulating material with apertures and indentations positioned for mounting circuit control elements; a terminal block composed of insulating material defining at least three aligned and spaced terminal connector pockets mounted on said terminal board, said terminal block having an L-shaped projection at each end and a central L-shaped locking tongue whereby said projections position said terminal block in indentations in said terminal board and said locking tongue snap fastens said terminal block in an aperture of said terminal board; female terminal connectors positioned in at least three of said terminal block pockets; circuits for selective control of said running windings connected to said female terminal connectors; and at least one U-shaped manually removable male connector link for connecting female terminals in adjacent pockets into a circuit.

2. A dynamoelectric machine as claimed in claim 1 wherein the terminal block has five pockets at least one of which does not have a female terminal connector positioned therein.

3. A dynamoelectric machine as claimed in claim 1 wherein the running windings in the stator are connected to terminal block connectors whereby connector links can selectively connect said windings in series or in parallel circuit relationship.

4. A dynamoelectric machine as claimed in claim 1 wherein there are two removable male connector links.

References Cited
UNITED STATES PATENTS

| | | | |
|---|---|---|---|
| 3,231,767 | 1/1966 | Powell | 310—71 |
| 3,453,403 | 7/1969 | Hoffman | 310—71 X |

DONOVAN F. DUGGAN, Primary Examiner

U.S. Cl. X.R.

318—225